United States Patent
Forsberg et al.

(10) Patent No.: US 9,706,395 B2
(45) Date of Patent: Jul. 11, 2017

(54) INTERSYSTEM MOBILITY SECURITY CONTEXT HANDLING BETWEEN DIFFERENT RADIO ACCESS NETWORKS

(75) Inventors: Dan Forsberg, Helsinki (FI); Valtteri Niemi, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1803 days.

(21) Appl. No.: 12/149,142

(22) Filed: Apr. 28, 2008

(65) Prior Publication Data

US 2009/0271623 A1     Oct. 29, 2009

(51) Int. Cl.
| | |
|---|---|
| *H04K 1/00* | (2006.01) |
| *H04W 12/04* | (2009.01) |
| *H04L 29/06* | (2006.01) |
| *H04W 12/10* | (2009.01) |
| *H04W 36/00* | (2009.01) |

(52) U.S. Cl.
CPC .......... *H04W 12/04* (2013.01); *H04L 63/123* (2013.01); *H04W 12/10* (2013.01); *H04W 36/0038* (2013.01); *H04L 63/205* (2013.01)

(58) Field of Classification Search
CPC ......... H04W 12/04; H04L 63/205; H04L 9/00
USPC ................ 455/411, 436, 404.1; 380/44, 270; 713/168, 171
See application file for complete search history.

(56) References Cited

U.S. PATENT DOCUMENTS

| | | | |
|---|---|---|---|
| 6,766,453 B1 * | 7/2004 | Nessett ................. | H04L 9/0844 455/410 |
| 2005/0176431 A1 | 8/2005 | Herrero Veron ............. | 455/436 |
| 2005/0197158 A1 * | 9/2005 | Silverbrook ............. | B41J 3/445 455/556.2 |
| 2005/0226423 A1 * | 10/2005 | Li et al. ........................ | 380/278 |
| 2005/0237983 A1 * | 10/2005 | Khalil .................. | H04L 63/061 370/338 |
| 2007/0264954 A1 * | 11/2007 | Qi et al. ..................... | 455/186.1 |
| 2007/0297611 A1 * | 12/2007 | Yun et al. ..................... | 380/270 |

FOREIGN PATENT DOCUMENTS

| | | |
|---|---|---|
| EP | 1841267 A2 | 10/2007 |
| WO | WO 03/065701 A1 | 8/2003 |

(Continued)

OTHER PUBLICATIONS

3GPP: 3$^{rd}$ Generation Partnership Project ; Technical Specification Group Services and System Aspects; 3GPP Architecture Evolution: Security Architecture; (3GPP TS 33.401 version 1.1.0 Release 8); (online ) Apr. 18, 2008, pp. 1-45, XP050140476.

(Continued)

*Primary Examiner* — Farid Homayounmehr
*Assistant Examiner* — Suman Debnath
(74) *Attorney, Agent, or Firm* — Harrington & Smith

(57) ABSTRACT

A method and apparatus for intersystem mobility security context handling between different radio access networks which can include a receiver configured to receive a tracking area update message from a user terminal. The message can include a first key identifier configured to identify a mapped security context and a second key identifier configured to identify a cached security context. A verifier can be configured to verify the tracking area update message with a key identified by the first or second key identifier.

21 Claims, 4 Drawing Sheets

(56) References Cited

FOREIGN PATENT DOCUMENTS

WO    WO 2004/008178 A2    1/2004
WO    WO-2008048179    4/2008

OTHER PUBLICATIONS

3GPP TS 25.401 V8.0.0 (Jun. 2008): $3^{rd}$ Generation Partnership Project; Technical Specification Group Radio Access Network; UTRAN overall description (release 8).
3GPP TS 36.300 V8.3.0 (Dec. 2007): $3^{rd}$ Generation Partnership Project; Technical Specification Group Radio Access Network; Evolved Universal Terrestrial Radio Access (E-UTRA) and Evolved Universal Terrestrial Access Network (E-utran) Overall Description; stage 2 (release 8).
3GPP TS 43.051 V7.0.0 (Aug. 2007), $3^{rd}$ Generation Partnership Project; Technical Specification Group GSM/EDGE Radio Access Network; Overall Description; stage 2 (release 7).
Nokia et al.; "pCR:Selecting Security Context"; S3-080390; 3GPP TSG SA WG3 Securit —SA3#51; Apr. 14-18, 2008; Vancouver, Canada; whole document (10 pages).

\* cited by examiner

INTERSYSTEM MOBILITY SECURITY CONTEXT HANDLING BETWEEN DIFFERENT RADIO ACCESS NETWORKS

BACKGROUND OF THE INVENTION

Field of the Invention

The invention generally relates to mobile communication networks. Particularly, the invention relates to intersystem mobility security context handling between different radio access networks.

Description of the Related Art

There exist a variety of different data communication systems or networks. Each network has its own characteristics and specifications. When there exists several different networks, there is always a problem of how to interconnect these networks, i.e. how to execute a switchover or handover of a connection from one network to another.

GSM EDGE Radio Access Network (GERAN) is the radio part of GSM/EDGE together with the network that joins the base stations The network represents the core of a GSM network, through which phone calls and packet data are routed from and to the PSTN and Internet to and from subscriber handsets.

UMTS Terrestrial Radio Access Network (UTRAN) is a collective term for the Node B's and Radio Network Controllers which make up the UMTS radio access network. The UTRANs is able to carry many traffic types from real-time Circuit Switched to IP based Packet Switched. The UTRAN contains base stations, which are called Node Bs, and Radio Network Controllers (RNC). The RNC provides control functionalities for one or more Node Bs.

Evolved UTRAN (E-UTRAN) is an evolution of the 3G UMTS radio access network towards a high-data-rate, low-latency and packet-optimized radio-access network.

In E-UTRAN user equipment (UE) can have both a mapped and cached security context during mobility from GERAN/UTRAN to E-UTRAN. In the mapped security context EPS (Evolved Packet System) keys and other security parameters are converted from received context from UTRAN/GERAN. In the cached security context EPS keys and other security parameters are cached in the EPS and re-used when UE moves to the EPS system, e.g. from UTRAN/GERAN or WiMAX/WLAN/DSL.

One of the problems in idle mode mobility or handover to/from E-UTRAN is that how does both user equipment and E-UTRAN negotiate key usage in the different cases when the user equipment has or does not have the cached security context or when E-UTRAN has or does not have the cached security context.

SUMMARY OF THE INVENTION

According to a first aspect of the invention there is provided a method comprising: receiving a tracking area update message from a user terminal, the message comprising a first key identifier identifying a mapped security context and a second key identifier identifying a cached security context; and verifying the tracking area update message with a key identified by the first or second key identifier.

In one embodiment of the invention, the tracking area update message comprises an indication identifying the key used to protect the tracking area update message and the tracking area update message is verified with the identified key.

In one embodiment of the invention, in the verification step, verifying the tracking area update message with a key identified by the first key identifier; and activating the cached security context with a security mode command procedure.

According to a second aspect of the invention there is provided a method comprising: sending to a user terminal a message comprising a first key identifier identifying a mapped security context and a second key identifier identifying a cached security context; and sending to an evolved UMTS terrestrial radio access network the mapped security context and the cached security context.

According to a third aspect of the invention there is provided a method comprising: receiving a mapped security context and a cached security context from an evolved packet core entity; receiving a handover complete message from a user terminal, the message comprising a first key identifier identifying the mapped security context and a second key identifier identifying the cached security context and the message being protected by the security context identified by the first key identifier or the second key identifier; and verifying the handover complete message based on the key identified by the first or second key identifier.

In one embodiment of the invention, the handover complete message further comprises an indication identifying the key used to protect the handover complete message, wherein the message is verified with the identified key.

According to a fourth aspect of the invention there is provided a method comprising: including a first key identifier identifying a mapped security context and a second key identifier identifying a cached security context in a tracking area update message; protecting the tracking area update message by using a key associated with the first key identifier or the second key identifier; and sending the tracking area update message to an evolved packet core entity.

In one embodiment of the invention, the method further comprises: including an indication identifying the key used to protect the tracking area update message in the tracking area update message.

In one embodiment of the invention, the method further comprises: activating the cached security context with a security mode command procedure.

According to a fifth aspect of the invention there is provided a method comprising: receiving a handover command message comprising a first key identifier identifying a mapped security context and a second key identifier identifying a cached security context; selecting a key identifier of a key in response to receiving the handover command message; including the selected key identifier in a handover complete message; protecting the handover complete message with the selected key; and sending the handover complete message to an evolved UMTS terrestrial radio access network.

In one embodiment of the invention, when selecting the key identifier, selecting the key identifier identifying the mapped security context; and including in the handover command message also the second key identifier.

In one embodiment of the invention, the handover complete message further comprises an indication identifying the key used to protect the handover complete message.

In one embodiment of the invention, when selecting the key identifier, selecting the key identifier identifying the cached security context.

According to a sixth aspect of the invention there is provided an apparatus comprising: a receiver configured to receive a tracking area update message from a user terminal, the message comprising a first key identifier identifying a mapped security context and a second key identifier identifying a cached security context; and a verifier configured to verify the tracking area update message with a key identified by the first or second key identifier.

In one embodiment of the invention, the tracking area update message comprises an indication identifying the key used to protect the tracking area update message and the tracking area update message is verified with the identified key.

In one embodiment of the invention, the verifier is configured to verify the tracking area update message with a key identified by the first key identifier; and an activator configured to activate the cached security context with a security mode command procedure.

According to a seventh aspect of the invention there is provided an apparatus comprising: a first transmitter configured to send to a user terminal a handover message comprising a first key identifier identifying a mapped security context and a second key identifier identifying cached security context; and a second transmitter configred to send to an evolved UMTS terrestrial radio access network the mapped security context and the cached security context.

According to a eight aspect of the invention there is provided apparatus comprising: a first receiver configured to receive a mapped security context and a cached security context from an evolved packet core entity; a second receiver configured to receive a handover complete message from a user terminal, the message comprising a first key identifier identifying the mapped security context and a second key identifier identifying the cached security context and the message being protected by the security context identified by the first key identifier or the second key identifier; and a verifier configured to verify the handover complete message based on the key identified by the first or second key identifier.

In one embodiment of the invention, the handover complete message further comprises an indication identifying the key used to protect the handover complete message, wherein the message is verified with the identified key.

According to a ninth aspect of the invention there is provided an apparatus comprising: a setting unit configured to include a first key identifier identifying a mapped security context and a second key identifier identifying a cached security context in a tracking area update message; a protector configured to protect the tracking area update message by using a key associated with the first key identifier or the second key identifier; and a transmitter configured to send the tracking area update message to an evolved packet core entity.

In one embodiment of the invention, the setting unit is configured to include an indication identifying the key used to protect the tracking area update message in the tracking area update message.

According to a tenth aspect of the invention there is provided an apparatus comprising: a receiver configured to receive a handover command message comprising a first key identifier identifying a mapped security context and a second key identifier identifying cached security context; a selection unit configured to select a key identifier of a key in response to receiving the handover command message; a setting unit configured to include the selected key identifier in a handover complete message; a protecting unit configured to protect the handover complete message with the selected key; and a transmitter configured to send the handover complete message to an evolved UMTS terrestrial radio access network.

In one embodiment of the invention, the selection unit is configured to select the key identifier identifying the mapped security context and to include in the handover command message also the second key identifier.

In one embodiment of the invention, the setting unit is configured to include in the handover complete message an indication identifying the key used to protect the handover complete message.

In one embodiment of the invention, the selection unit is configured to select the key identifier identifying the cached security context.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the invention, examples of which are illustrated in the accompanying drawings.

Figure 1A:
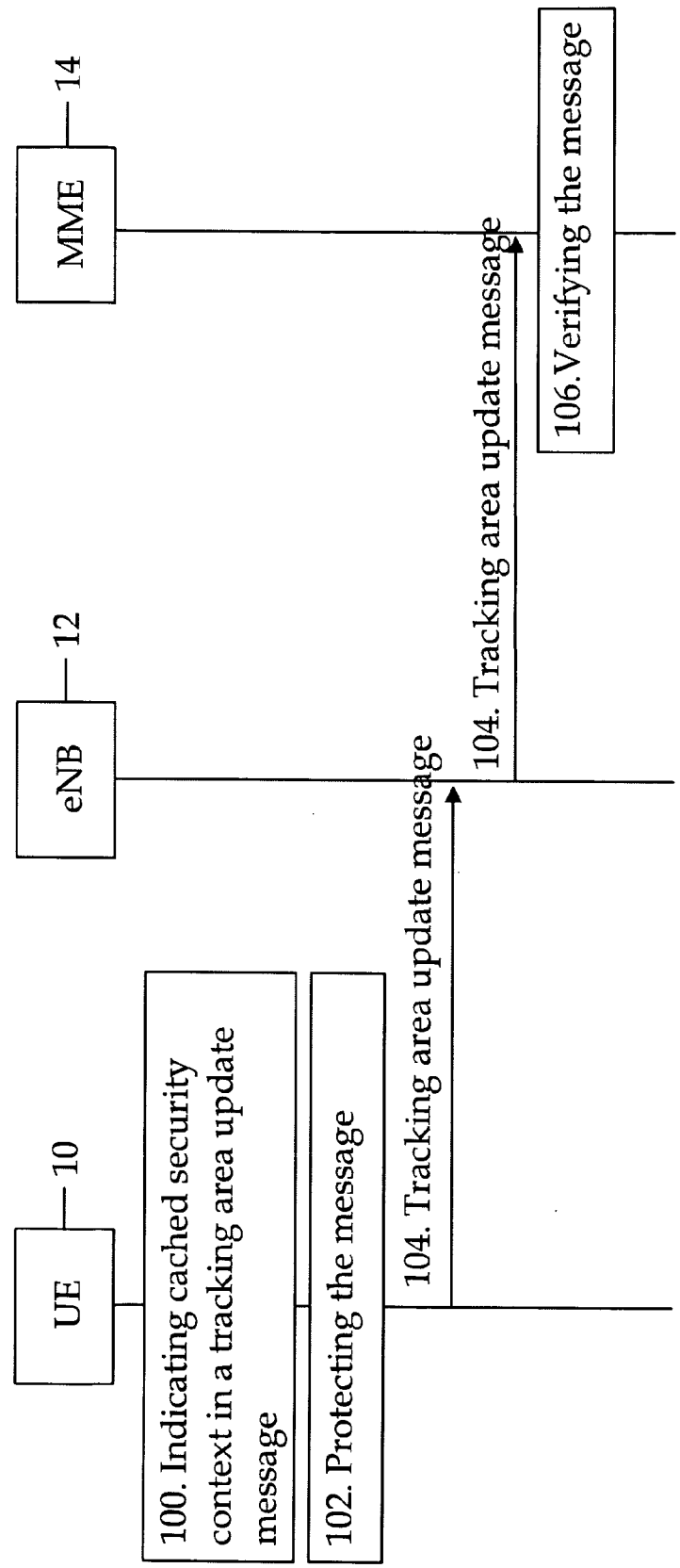
FIG. 1a is a sequence diagram illustrating one embodiment of the invention.

FIG. 1a discloses an embodiment of the invention in which user equipment (UE) 10 moves from UTRAN to E-UTRAN. E-UTRAN comprises one or more evolved node B's (eNB) 12 which are connected to a mobility management entity 14. E-UTRAN and the mobility management entity are specified in more detail e.g. in specification 3GPP TS 36.300 V8.3.0 (2007-12). UTRAN and SGSN are discussed in more detail e.g. in specification 3GPP TS 25.401 V8.0.0 (2007-12).

The user equipment 10 includes a key identifier ($K_{ASME}$ Key Set Identifier, $KSI_{ASME}$, in E-UTRAN) identifying a cached security context in a tracking area update (TAU) message (104). The user equipment 10 uses cached security context for deriving Non Access Stratum (NAS) keys and for integrity protecting a Tracking Area Update (TAU) request message during idle mode mobility from UTRAN to E-UTRAN. In one embodiment, the user equipment may have the cached security context available for a predetermined time period, and is thus able to directly use it instead of the mapped security context.

In this embodiment, the mobility management entity 14 has also in its possession the cached security context. The included $K_{ASME}$ in the TAU message identifies for the mobility management entity 14 which key to use for verifying the TAU message. Thus the mobility management node 14 able to verify (106) the message with the correct key.

If, for some reason, the mobility management entity 14 did not have the cached context available any more, an Authentication and Key Agreement (AKA) procedure may be run to establish a new security context.

Figure 1B:
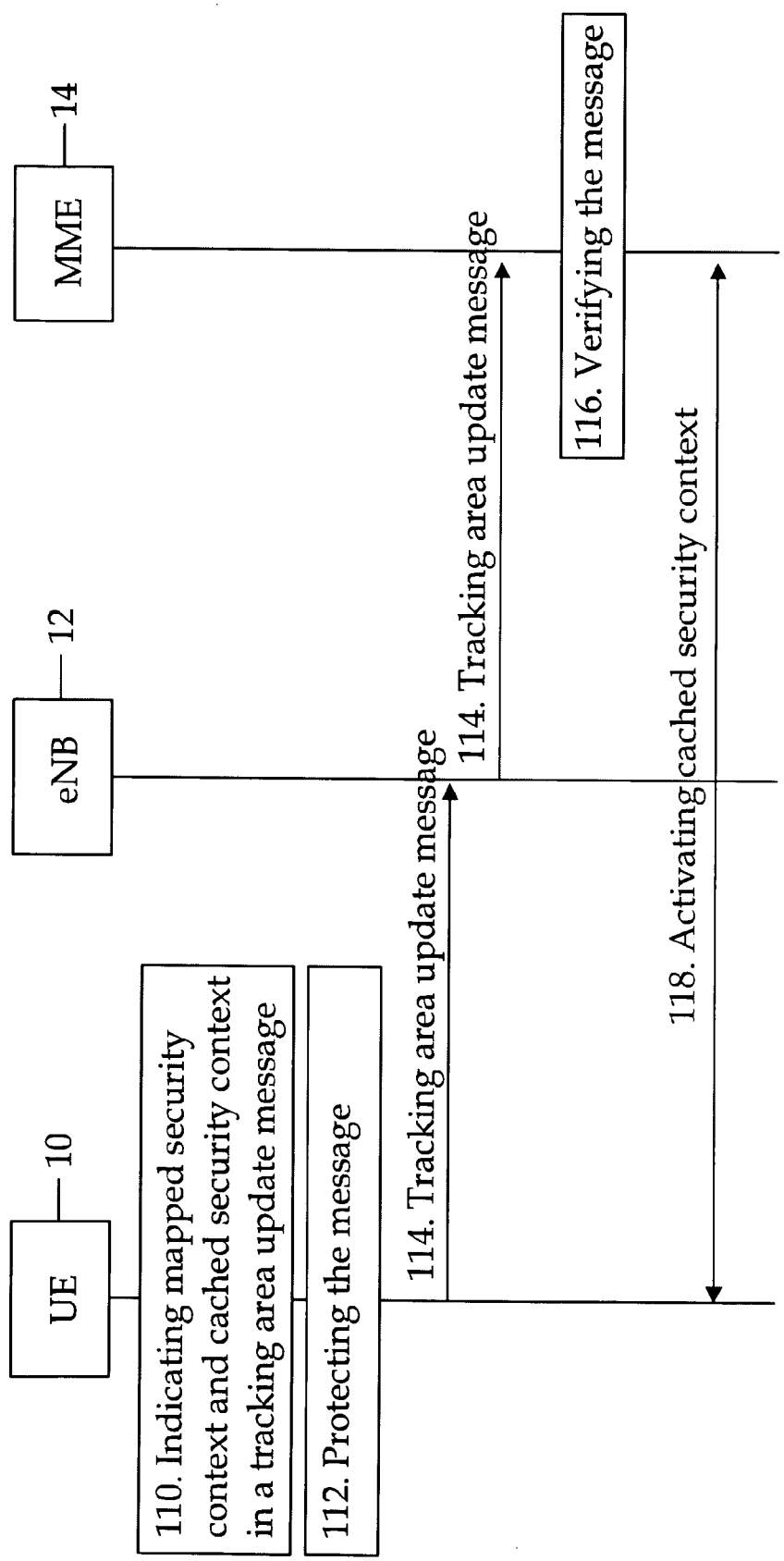
FIG. 1b is a sequence diagram illustrating another embodiment of the invention.

FIG. 1b discloses an embodiment of the invention in which user equipment (UE) 10 moves from UTRAN to E-UTRAN. E-UTRAN comprises one or more evolved node B's (eNB) 12 which are connected to a mobility management entity 14. E-UTRAN and the mobility management entity are specified in more detail e.g. in specification 3GPP TS 36.300 V8.3.0 (2007-12). UTRAN and SGSN are specified in more detail e.g. in specification 3GPP TS 25.401 V8.0.0 (2007-12).

The user equipment has in its possession two security contexts (mapped and cached). In this embodiment, the user equipment 10 includes two key identifiers (KSI and KSI$_{ASME}$) in a tracking area update (TAU) message. KSI identifies the mapped security context and KSI$_{ASME}$ identifies the cached security context. The user equipment then uses the mapped security context for deriving Non Access Stratum (NAS) keys and for integrity protecting a Tracking Area Update (TAU) request message during idle mode mobility from UTRAN to E-UTRAN.

In one embodiment, the tracking area update message comprises TMSI (Temporary Mobile Subscriber Identity), RAI (Routing Area Identity) and KSI (Key Set Identifier) of the mapped security context. Since in this embodiment, the user equipment 10 has also a cached security context in its possession, the tracking area update message comprises also a GUTI/S-TMSI/M-TMSI (GUTI, Globally Unique Temporary Identity), TAI (Tracking Area Identity) and KSI$_{ASME}$ of the cached security context.

The user equipment 10 sends (114) the tracking area update message to the eNB 12, which forwards it further to the mobility management entity 14. The mobility management entity 14 selects a correct key based on the key identifier (KSI) and verifies (116) message. Although the user equipment protected the TAU message by using the mapped security context, the identifier (KSI$_{ASME}$) identifying the cached security context is still comprised in the TAU message. This indicates to the mobility management entity 14 that the user equipment has also the cached security context available and that it is able to use also that. The mobility management entity 14 may activate (118) the cached security context with Security Mode Command (SMC) procedure if needed.

In one embodiment, the tracking area update message comprises an indication identifying the key used to protect the tracking area update message. Based on the indication, the mobility management entity 14 is able to use the correct key to verify the message.

Figure 2A:
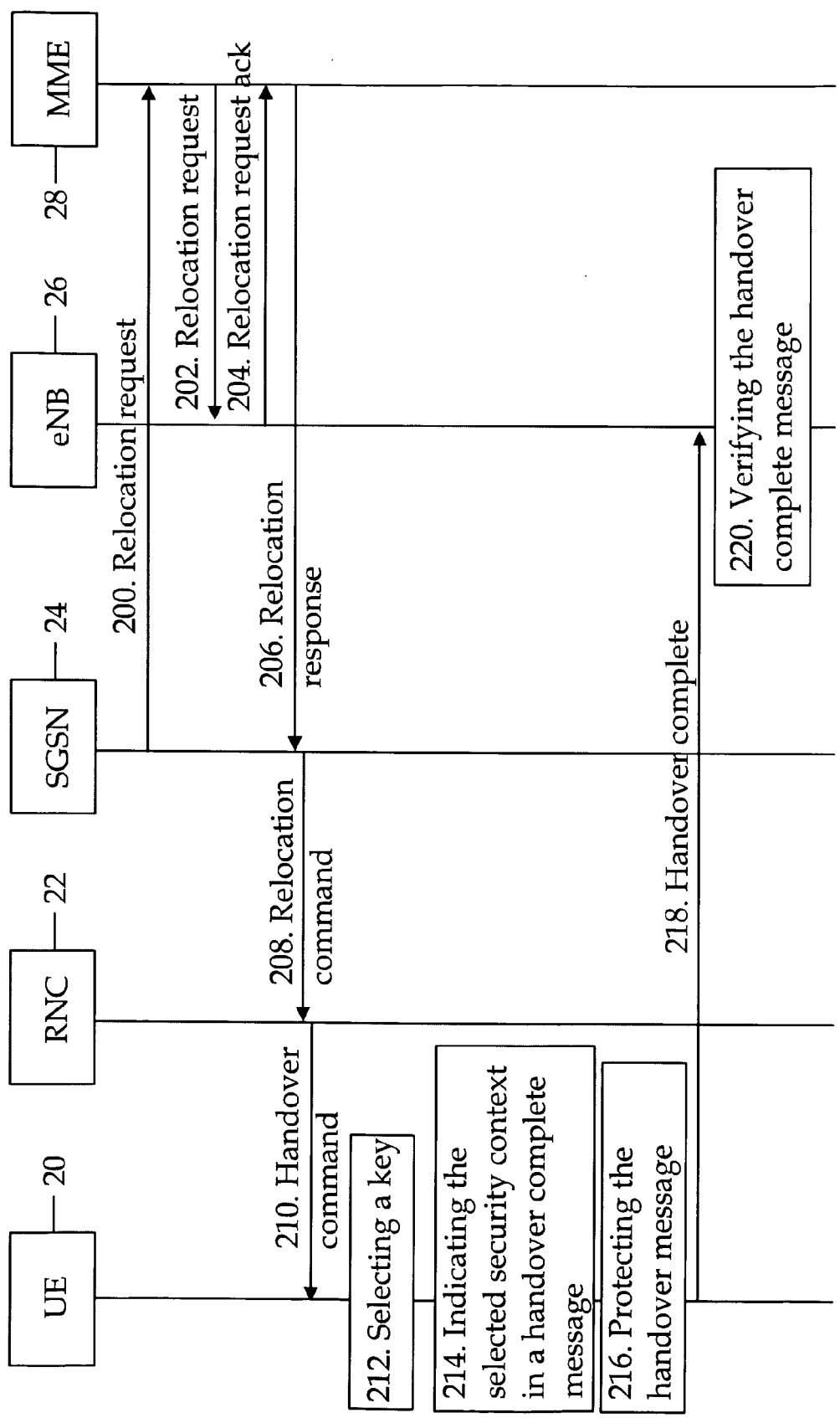
FIG. 2a is a sequence diagram illustrating another embodiment of the invention.

FIG. 2a discloses an embodiment of the invention in which user equipment (UE) 20 moves from UTRAN or GERAN to E-UTRAN in an active mode (handover). E-UTRAN comprises one or more evolved node B's (eNB) 26 which are connected to a mobility management entity 28. E-UTRAN and the mobility management entity are discussed in more detail e.g. in specification 3GPP TS 36.300 V8.3.0 (2007-12). UTRAN and SGSN are discussed in more detail e.g. in specification 3GPP TS 25.401 V8.0.0 (2007-12). GERAN and SGSN are discussed in more detail e.g. in specification 3GPP TS 43.051 V7.0.0 (2007-12).

The SGSN transfers UE's (GERAN/UTRAN and possibly also EPC/E-UTRAN) security capabilities to the mobility management entity 28 in a relocation request message (200). The mobility management entity 28 then selects the NAS security algorithms and includes the allowed UP/RRC algorithms as well as the RRC and UP keys, both mapped and cached security context based in the relocation request message (202) to the target eNB 26. The eNB 26 selects the RRC and UP algorithms and indicates them in the relocation request acknowledgement message (204) to the mobility management entity 28. The mobility management entity 28 includes the selected NAS, UP, and RRC algorithms in a relocation response message (206) along with a KSI/CKSN and KSI$_{ASME}$ to an SGSN 24. KSI/CKSN identifies a key for mapped security context and KSI$_{ASME}$ identifies a key for cached security context. KSI is used in UTRAN and CKSN is used in GERAN network.

Since the handover is an intersystem handover, a transparent container included in the relocation response message sent by the mobility management entity 28 includes also other radio resource configuration data so that the user equipment 20 is able to select correct parameters (e.g. link level identity, correct frequencies, etc.) and to be able to find the correct eNB.

The SGSN 24 includes the parameters in a relocation command message (208) and a radio network controller (RNC) 22 in UTRAN indicates them to the user equipment 20 in a handover from UTRAN command (210).

In response to the handover command message (210), the user equipment selects (212) a key to be used for protecting a handover complete message to be sent to the eNB. The user equipment 20 includes (214) a key identifier (KSI/CKSN or KSI$_{ASME}$) of the selected key in the handover complete message (218). In addition to the key identifier, the handover complete message may include an indication whether the key identifier identifies the mapped or cached security context. The indication is e.g. a 1-bit value for which the meanings of '0' and '1' have been previously determined. The key identifier identifies to the eNB whether the user equipment used the mapped security context or the cached security context to protect the handover complete message. Based on the key identifier the eNB uses the correct security context to verify (220) the handover complete message.

In another embodiment, the user equipment may include in the handover complete message key identifiers identifying both the mapped and cached security context. At the same time the user equipment may also indicate to the eNB which one of the keys (KSI/CKSN or K$_{ASME}$) was used to protect the handover complete message. If mapped security context was used, the evolved packet system may activate cached security context with a Security Mode Command (SMC) procedure and avoid running Authentication and Key Agreement (AKA).

Figure 2B:
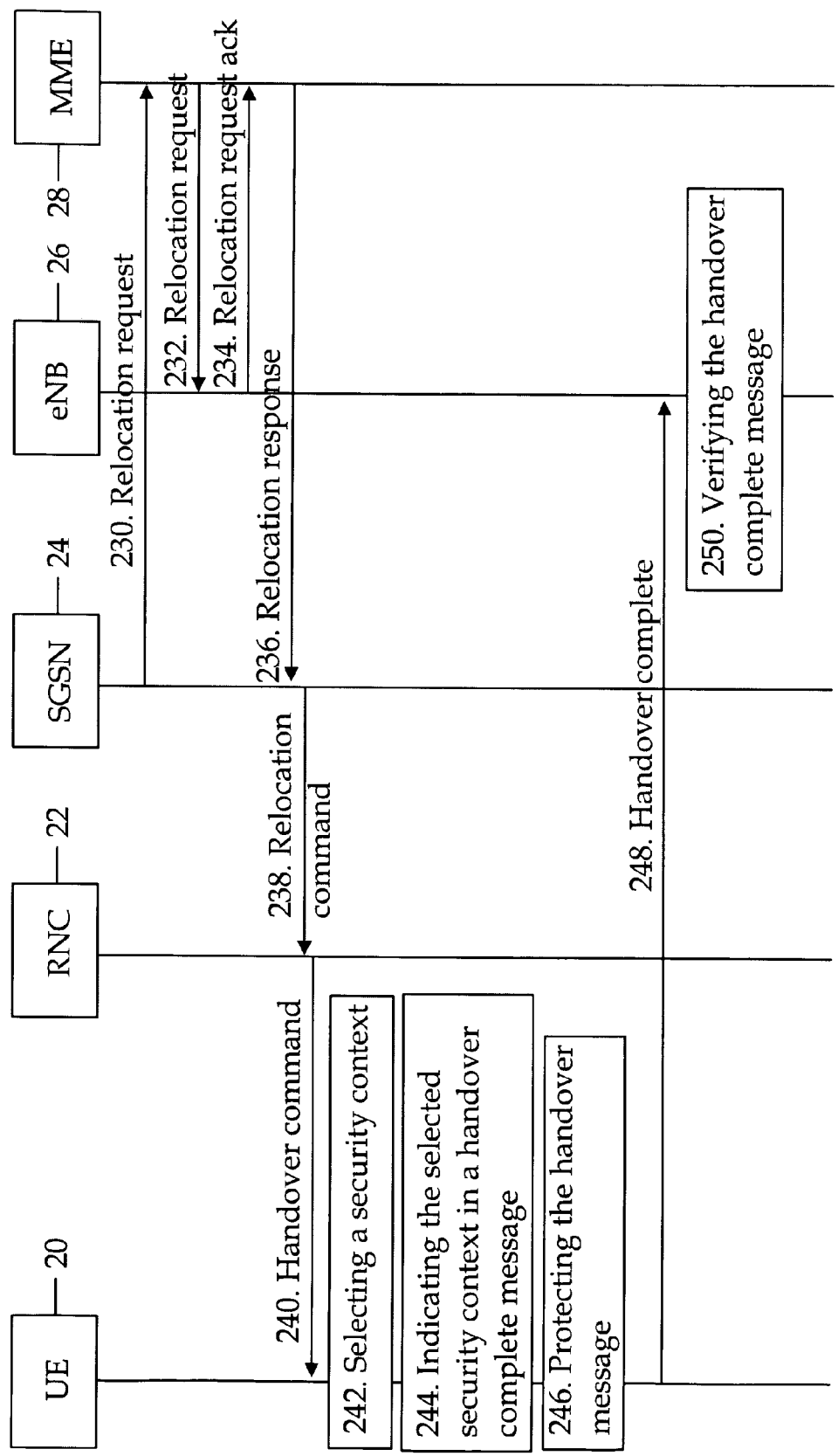
FIG. 2b is a sequence diagram illustrating another embodiment of the invention.

FIG. 2b discloses an embodiment of the invention in which user equipment (UE) 20 moves from UTRAN or GERAN to E-UTRAN. E-UTRAN comprises one or more evolved node B's (eNB) 26 which are connected to a mobility management entity 28. E-UTRAN and the mobility management entity are discussed in more detail e.g. in specification 3GPP TS 36.300 V8.3.0 (2007-12). GERAN and SGSN are discussed in more detail e.g. in specification 3GPP TS 43.051 V7.0.0 (2007-12). UTRAN and SGSN are discussed in more detail e.g. in specification 3GPP TS 25.401 V8.0.0 (2007-12).

FIG. 2b discloses another embodiment of the invention in which user equipment (UE) 20 moves from GERAN/UTRAN to E-UTRAN in an active mode (handover). E-UTRAN comprises one or more evolved node B's (eNB) 26 which are connected to a mobility management entity 28. E-UTRAN and the mobility management entity are discussed in more detail e.g. in specification 3GPP TS 36.300 V8.3.0 (2007-12). GERAN and SGSN are discussed in more detail e.g. in specification 3GPP TS 43.051 V7.0.0 (2007-12). UTRAN and SGSN are discussed in more detail e.g. in specification 3GPP TS 25.401 V8.0.0 (2007-12).

The SGSN transfers UE's (GERAN/UTRAN and possibly also EPC/E-UTRAN) security capabilities to the mobility management entity 28 in a relocation request message (230). The mobility management entity 28 then selects the NAS security algorithms and includes the allowed UP/RRC algorithms as well as the RRC and UP keys, mapped or cached security context based in the relocation request message (232) to the target eNB 26. The eNB 26 selects the RRC and UP algorithms and indicates them in the relocation request acknowledgement message (234) to the mobility management entity 28. The mobility management entity 28 includes the selected NAS, UP, and RRC algorithms in a relocation response message (236) along with a KSI/CKSN or $KSI_{ASME}$ to an SGSN 24. KSI/CKSN identifies a key for mapped security context and $KSI_{ASME}$ identifies a key for cached security context. KSI is used in UTRAN and CKSN is used in GERAN network. The SGSN 24 includes them in the relocation command (238) and a radio network controller (RNC) 22 indicates them to the user equipment 20 in a handover from UTRAN command (240).

Since the handover is an intersystem handover, a transparent container included in the relocation response message sent by the mobility management entity 28 includes also other radio resource configuration data so that the user equipment 20 is able to select correct parameters (e.g. link level identity, correct frequencies, etc.) and to be able to find the correct eNB.

In another embodiment, although the mobility management entity 28 might include in the relocation response message (236) only the cached security context to the user equipment 20, the mobility management entity 28 may send both the mapped and cached security context to the eNB 26. This may be useful in a case in which the user equipment 20 does not have the cached security context at all (although the mobility management entity 28 indicated only the cached security context to the user equipment 28). The user equipment would 28 then be forced to use the mapped security context, and the eNB 26 would also have it.

In response to the handover command message, the user equipment selects (242) a key to be used for protecting a handover complete message to be sent to the eNB. As disclosed above, in one embodiment the mobility management entity 28 may send a key identifier that identifies only the cached security context. For some reason (expired cached security context timer etc.) the user equipment may not have any more the cached security context. Therefore, the only option is to choose the mapped security context. In another embodiment, the user equipment has the cached security context available and chooses to use that.

In a further embodiment the handover command message (240) included only a key identifier identifying the mapped security context. The user equipment 20 has two options. The first option is to choose the mapped security context as instructed by the mobility management entity 28. The second option is to choose the cached security context if it is abailable at the user equipment although the mobility management entity 28 instructed to use the mapped security context.

The user equipment 20 includes (244) a key identifier (KSI, CKSN or $K_{ASME}$) of the selected key in a handover complete message (248). In one embodiment, when the user equipment 20 chooses the mapped security (KSI in UTRAN or CKSN in GERAN), the user equipment may also include a key identifier of the cached security context in the handover complete message. Then the evolved packet system can activate cached security context with a Security Mode Command (SMC) procedure and avoid running Authentication and Key Agreement (AKA). The user equipment 20, however, protects the handover complete message by using the mapped security (KSI/CKSN).

In one embodiment, in addition to the key identifier, the handover complete message may include an indication whether the key identifier identifies the mapped or cached security context. The indication is e.g. a 1-bit value for which the meanings of '0' and '1' have been previously determined.

The key identifier and the indication identify to the eNB whether the user equipment used the mapped security context or the cached security context to protect the handover complete message. Based on the key identifier the eNB uses the correct security context to verify (250) the handover complete message.

The exemplary embodiments can include, for example, any suitable mobile devices, mobile phones, smart phones, personal digital assistants, laptop computers, servers, and mobile communication devices, audio/video players capable of performing the processes of the exemplary embodiments. Furthermore, the exemplary embodiments can include, for example, wireless networks, mobile communication networks and various network elements of the corresponding network. The devices and subsystems of the exemplary embodiments can communicate with each other using any suitable protocol and can be implemented using one or more programmed computer systems or devices.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices. Furthermore, the claimed methods may be implemented as a computer program. The units and other elements of the apparatuses may be implemented with any appropriate means including various hardware and/or software solutions.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method, comprising:
   receiving a tracking area update message from a user terminal, the message comprising a first key identifier identifying a mapped security context and a second key identifier identifying a cached security context; and
   if cached security context is available, verifying the tracking area update message with a key identified by the second key identifier, otherwise, verifying, the tracking area update message with a key identified by the first key identifier.

2. The method according to claim 1, wherein the tracking area update message is verified with the identified key.

3. The method according to claim 1, wherein the tracking area update message uses the mapped security context, and wherein in the verification step,
   verifying the tracking area update message with a key identified by the first key identifier; and
   activating the cached security context with a security mode command procedure.

4. A method, comprising:
   sending to a user terminal a message comprising a first key identifier identifying a mapped security context and a second key identifier identifying a cached security context; and
   sending to an evolved universal mobile telecommunications system terrestrial radio access network the mapped security context and the cached security context, wherein if cached security context is available, a tracking area update message is verified with a key identified by the second key identifier, otherwise, the tracking area update message is verified with a key identified by the first key identifier.

5. A method, comprising:
   receiving a mapped security context and a cached security context from an evolved packet core entity;
   receiving a handover complete message from a user terminal, the message comprising a first key identifier identifying the mapped security context and a second key identifier identifying the cached security context and the message being protected by the security context identified by the first key identifier or the second key identifier; and
   verifying the handover complete message with the key identified by the first or second key identifier, wherein if cached security context is available, a tracking area update message from the user terminal is verified with a key identified by second key identifier, otherwise, the tracking area update message is verified with a key identified by the first key identifier.

6. The method according to claim 5, wherein the message is verified with the identified key.

7. A method, comprising:
   including a first key identifier identifying a mapped security context and a second key identifier identifying a cached security context in a tracking area update message;
   protecting the tracking area update message using a key associated with the first key identifier and the second key identifier;
   protecting the tracking area update message by using the key identified by the indication; and
   sending the tracking area update message to an evolved packet core entity, wherein if cached security context is available, the tracking area update message is verified with a key identified by the second key identifier, otherwise, the tracking area update message is verified with a key identified by the first key identifier.

8. The method according to claim 7, wherein the tracking area update message uses the mapped security context, and further comprising:
   activating the cached security context with a security mode command procedure.

9. A method, comprising:
receiving a handover command message comprising a first key identifier identifying a mapped security context and a second key identifier identifying a cached security context;
selecting a key identifier of a key in response to receiving the handover command message;
including the selected key identifier in a handover complete message;
protecting the handover complete message with the selected key; and
sending the handover complete message to an evolved universal mobile telecommunications system terrestrial radio access network, wherein if cached security context is available, a tracking area update message is verified with a key identified by the second key identifier, otherwise, the tracking area update message is verified with a key identified by the first key identifier.

10. The method according to claim 9, wherein:
when selecting the key identifier, selecting the key identifier identifying the mapped security context; and
including in the handover command message also the second key identifier.

11. The method according to claim 9, wherein:
when selecting the key identifier, selecting the key identifier identifying the cached security context.

12. An apparatus, comprising:
at least one processor; and
at least one memory including computer program code, where the at least one memory and the computer program code are configured, with the at least one processor, to cause the apparatus to at least:
receive a tracking area update message from a user terminal, the message comprising a first key identifier identifying a mapped security context and a second key identifier identifying a cached security context; and
verify the tracking area update message with a key identified by the first or second key identifier, wherein if cached security context is available, the tracking area update message is verified with the key identified by the second key identifier, otherwise, the tracking area update message is verified with the key identified by the first key identifier.

13. The apparatus according to claim 12, wherein the tracking area update message is verified with the identified key.

14. The apparatus according to claim 12, wherein the tracking area update message uses the mapped security context, and wherein the at least one memory and the computer program code is configured, with the at least one processor, to cause the apparatus to:
verify the tracking area update message with a key identified by the first key identifier; and
activate the cached security context with a security mode command procedure.

15. An apparatus, comprising:
at least one processor; and
at least one memory including computer program code, where the at least one memory and the computer program code are configured, with the at least one processor, to cause the apparatus to at least:
send to a user terminal a handover message comprising a first key identifier identifying a mapped security context and a second key identifier identifying cached security context; and
send to an evolved universal mobile telecommunications system terrestrial radio access network the mapped security context and the cached security context, wherein if cached security context is available, a tracking area update message is verified with a key identified by the second key identifier, otherwise, the tracking area update message is verified with a key identified by the first key identifier.

16. An apparatus, comprising:
at least one processor; and
at least one memory including computer program code, where the at least one memory and the computer program code are configured, with the at least one processor, to cause the apparatus to at least:
receive a mapped security context and a cached security context from an evolved packet core entity;
receive a handover complete message from a user terminal, the message comprising a first key identifier identifying the mapped security context and a second key identifier identifying the cached security context and the message being protected by the security context identified by the first key identifier or the second key identifier; and
verify the handover complete message with the key identified by the first or second key identifier, wherein if cached security context is available, a tracking area update message from the user terminal is verified with a key identified by the second key identifier, otherwise, the tracking area update message is verified with a key identified by the first key identifier.

17. The apparatus according to claim 16, wherein the message is verified with the identified key.

18. An apparatus, comprising:
at least one processor; and
at least one memory including computer program code, where the at least one memory and the computer program code are configured, with the at least one processor, to cause the apparatus to at least:
include a first key identifier identifying a mapped security context and a second key identifier identifying a cached security context in a tracking area update message;
protect the tracking area update message by using a key associated with the first key identifier or the second key identifier; and
send the tracking area update message to an evolved packet core entity, wherein if cached security context is available, the tracking area update message is verified with a key identified by second key identifier, otherwise, the tracking area update message is verified with a key identified by the first key identifier.

19. An apparatus comprising:
at least one processor; and
at least one memory including computer program code, where the at least one memory and the computer program code are configured, with the at least one processor, to cause the apparatus to at least:
receive a handover command message comprising a first key identifier identifying a mapped security context and a second key identifier identifying cached security context;
select a key identifier of a key in response to receiving the handover command message;
include the selected key identifier in a handover complete message;
protect the handover complete message with the selected key; and
send the handover complete message to an evolved universal mobile telecommunications system terrestrial radio access network, wherein if cached security context is available, a tracking area update message is verified with a key identified by the second key identifier, otherwise, the tracking area update message is verified with a key identified by the first key identifier.

20. The apparatus according to claim 19, wherein the at least one memory and the computer program code is configured, with the at least one processor, to cause the apparatus to select the key identifier identifying the mapped security context and to include in the handover command message also the second key identifier.

21. The method according to claim 19, wherein the at least one memory and the computer program code is configured, with the at least one processor, to cause the apparatus to select the key identifier identifying the cached security context.

* * * * *